2,734,047
OLEFIN POLYMERIZATION WITH SbS₅ CATALYST

Winthrope C. Smith and Robert M. Thomas, Westfield, N. J., assignors to Esso Research and Engineering Company, a corporation of Delaware No Drawing. Application August 31, 1951, Serial No. 244,726

11 Claims. (Cl. 260—85.3)

This invention relates to a low temperature polymerization process for a polymerizable monomer having olefinic unsaturation, and more particularly the process relates to a novel catalyst consisting essentially of antimony pentafluoride which is used as the active catalytic agent in the low temperature polymerization of an olefinic material having either a straight chain or an iso structure either polymerized alone or copolymerized with a second olefin or multiolefin, particularly a diolefin, to form both homopolymers and copolymers.

It is known to produce a polymer of an olefin such as, for instance, propylene or isobutylene, by polymerizing these olefins either alone or in some cases with a monoolefin such as styrene, or methyl styrene, or a multiolefin such as, for example, isoprene or butadiene, at temperatures ranging from —20° C. to —165° C. by the application thereto of the well-known Friedel-Crafts type of catalyst, the catalyst preferably being in solution in a low-freezing, non-complex-forming solvent. The resulting polymerization reaction yields useful products varying from oils to solid rubber-like polymers and inelastic resins of molecular weight substantially greater than that of the olefinic monomers. Other olefins which may be used alone or in mixtures for polymerizations include α,p-dimethyl styrene, p-chloro-styrene, piperylene, dimethyl butadiene, cyclopentadiene, 2-methyl pentadiene-1,3, and vinyl ethers such as vinyl methyl ether and vinyl hexyl ether.

The present invention is based upon the discovery that antimony pentafluoride possesses superior qualities when employed as a catalyst for the polymerization of olefinic feeds, although antimony pentachloride, which is widely known as a Friedel-Crafts catalyst, does not show significant polymerization activity under similar experimental conditions. These effects are unpredictable.

For example, although aluminum chloride is well-known to be an excellent catalyst for low temperature polymerizations, aluminum fluoride has been found to be completely inert as to its catalytic effect on polymerizations. Similarly, titanium tetrachloride is very active but titanium tetraflouride is inert. Zirconium tetrachloride, when suitably combined into a complex is likewise very active as a polymerization catalyst. Zirconium tetraflouride, however, is totally inactive. On the other hand, boron fluoride is very active but boron chloride shows only poor catalytic effects, giving very slow reaction, poor yield, and poor quality polymer.

Among the polymerization reactions in which the novel polymerization catalyst of the present invention is applicable is the polymerization of olefins having from 3 to 14, inclusive, carbon atoms per molecule, and preferably between 3 to 8, inclusive, carbon atoms per molecule. The invention is valuable for polymerization of olefins or iso-olefins alone to form homopolymers. Among the olefins which can be polymerized by antimony pentafluoride is propylene, which under the influence of this catalyst at reduced temperatures, forms oily to resinous polymerized products. The formation of homopolymers of the iso-olefins, such as isobutylene, is of particular importance and can be carried out using antimony pentafluoride in solution as the polymerization catalyst and employing the well-known techniques and conditions for the production of such homopolymers.

Control of the reaction to form the homopolymer is essential in order to prevent the formation of polymers having molecular weights which are either too high or too low. The catalyst may be employed in amounts from less than 0.1–0.5% of active catalyst up to 2 or 3% for more rapid and more complete reaction of the olefins. Temperature adjustment is also of some criticalness in proper control of the reaction.

It is generally desirable to employ a diluent for the reaction and practically any inert, non-complexing solvent having a freezing point below 0° C. can be used. The mono- and polyalkyl halides, particularly the chlorides and fluorides having from 1 up to 4 or 5 carbon atoms have been found especially useful. The amount of halogen present may vary from one atom per molecule up to the replacement of one-half of the hydrogen atoms by halogen atoms. In the polymerization of isobutylene, for instance, the resulting product may vary from a sticky or semi-solid material to one of solid and rubber-like consistency, depending upon catalyst concentration and temperatures employed. The product is colorless and clear and soluble in liquid hydrocarbons. Polymerized products prepared from isobutylene having a Staudinger molecular weight of between 1,000 and 500,000 are possible.

It is further contemplated to use antimony pentafluoride as the catalyst in polymerization reactions for preparing tough, thermoplastic copolymers from an iso-olefin having from 4 to 8, inclusive, carbon atoms per molecule, such as iso-amylene or preferably isobutylene, copolymerized with a styrene, such as alpha-methyl styrene, para-methyl styrene, or preferably with styrene itself. These resinous copolymers are prepared by polymerizing a mixture of 5 to 80, preferably 10 to 60, weight per cent of styrene with the balance of the iso-olefin at low temperatures, preferably between about —60° C. and —150° C., using dissolved antimony pentafluoride as the catalyst. It is usually desirable to prepare the catalyst in the form of a solution having from 0.1 up to 5% concentration of the active catalyst present. Methyl chloride is especially advantageous for use as the catalyst diluent, although other suitable solvents such as other mono- or polyhalogenated alkanes of 1 to 3 carbon atoms, which are unreactive and liquid at the polymerization temperature, may also be employed to assist in solubilizing the antimony pentafluoride catalyst. Ethylidene difluoride is of especial use. Liquids which may be employed include methyl bromide, methyl chloride, methylene chloride, ethyl chloride, and the like.

In preparing these iso-olefin-styrene copolymers, it is usually desirable to dilute the reactive monomers of the polymerization mixture with about 1 to 10, preferably 2 to 5, volumes of an inert diluent per volume of reactive olefinic feed. The polymerization mixture is cooled either internally or externally and the catalyst added to the cold polymerization mixture. The general technique of preparing this type of styrene copolymer is well known and broadly described in United States Patent, 2,274,749.

As a further type of polymer which may be prepared by polymerization employing antimony pentafluoride as the catalyst, there may be included the low temperature polymerization process in which an iso-olefin and a multi-olefin, particularly a conjugated diolefin, are polymerized to form interpolymers. It is well known that a valuable rubbery interpolymer may be produced by copolymerizing a major proportion of an iso-olefin having from 4 to 8, inclusive, carbon atoms per molecule, such as isobutylene, with a minor proportion of a multi-olefin, preferably a conjugated diolefin such as butadiene or isoprene, at temperatures ranging from 0° C. to —165° C., by the application thereto of a Friedel-Crafts catalyst, the catalyst preferably being in solution in a low-freezing, non-complex-forming solvent. The general technique is broadly described in United States Patent 2,356,128. The resulting polymerization reaction yields solid, rubber-like polymers of high molecular weight which are reactive with vulcanizing agents such as sulfur in a curing reaction somewhat analogous to a vulcanization of natural rubber.

In order to produce this valuable interpolymer, isobutylene is employed as one of the preferred components but other iso-olefins, preferably of 4 to 6, inclusive, carbon atoms per molecule, such as 2-methyl butene-1, 2-methyl pentene-1, or 2-methyl hexene-1, may be employed. Ninety-nine to 50 weight per cent of the iso-olefin is mixed with from 1 to 50 weight per cent of a multi-olefin having 4 to 12, inclusive, carbon atoms per molecule, preferably a conjugated diolefin, such as butadiene or isoprene. Other multi-olefins which may be used, however, include piperylene, dimethyl butadiene, cyclopentadiene, divinylbenzene, dimethallyl, or myrcene. For most purposes, the conjugated diolefins having from 4 to 6, inclusive, carbon atoms per molecule are much preferred. A preferred reaction mixture consists of a major proportion of iso-olefin admixed with a minor proportion of diolefin such as 1–5% of isoprene or 10–50% of butadiene. By the use of more diolefin in the reaction mixture, more unsaturated products can be obtained. The olefinic reaction mixture, usually diluted with 1 to 3 volumes of inert diluent per volume of mixture, is cooled to a temperature within the range of from $-20°$ C. to $-100°$ C. or even as low as $-165°$ C. either externally by the use of a refrigerating jacket around the reactor or internally by admixture with the polymerizable olefins of a refrigerant such as liquid propane, liquid ethane, liquid ethylene, or even liquid methane, or solid carbon dioxide.

The polymerization of the thus prepared cold olefin reaction mixture is caused to occur by application thereto of antimony pentafluoride, particularly in solution in a suitable solvent. It is preferred that the solvent chosen not form a complex with the catalyst. It should also remain substantially liquid at the polymerization temperature. Furthermore, the solvent should preferably dissolve the antimony pentafluoride to the extent of at least 0.05 gram per 100 cc. of solvent.

The catalyst solution of antimony pentafluoride dissolved in a solvent consisting of a suitable solvent such as methyl chloride or ethylidene difluoride may be applied to the cold mixed olefinic material in the form of a spray delivered onto the surface of the rapidly stirred olefinic polymerization mixture. Alternatively, the catalyst solution may be delivered as a jet into a zone of high turbulence in the olefinic material in any convenient way or it may be delivered in any convenient manner which obtains a rapid dispersion of the catalyst solution into the cold olefinic mixture. Since the $SbF_5$ material is not soluble in the alkyl hydrocarbons to any extent; they cannot be used as solvents for the catalyst solution. A range of catalyst concentrations of from 0.05 gram of $SbF_5$ to 5 grams of $SbF_5$ per 100 cc. solvent can be used, the preferred concentrations being from 0.2 to 1 gram of $SbF_5$ per 100 cc. of solvent.

As a specific example of a favored manner for preparing the catalyst solution for the polymerization reaction, a solution can be made by mixing 0.5 gram of $SbF_5$ per 100 cc. of methyl chloride, boiling a few minutes, filtering and diluting with additional solvent.

Polymers and copolymers prepared using this novel polymerization catalyst, may be brought up to room temperature from the temperature of the polymerization mixture in any convenient manner. One preferred procedure is to dump the entire reaction mixture into warm water or a warm alkaline aqueous solution or warm alcohol or the like in order to flash off remaining monomers and other volatile ingredients present in the reaction mixture, precipitate the polymer, quench the catalyst, and start the purification of the remaining polymerized product. The solid polymer is then finished by washing on a roll mill or kneader with clear water to obtain further and more complete purification or it may, if desired, be purified in any number of well-known ways.

The polymerization experiment shown below as examples describes a number of specific embodiments of the invention, although it is not intended to limit the scope thereto.

*Example 1.—Polyisobutylene*

About 1050 grams of methyl chloride diluent and 350 gms. of isobutylene were charged to a brass reactor equipped with baffles as a means of agitating the contents. The charge was cooled externally with liquid ethylene to $-102°$ C. About 800 cc. of catalyst solution consisting (at $-78°$ C.) of 0.2 g. $SbF_5/100$ cc. of methyl chloride was carefully added over a period of 43 minutes. Particles of polymer formed instantly with catalyst addition changing from large to small particles as the reaction proceeded. The reaction was quenched with alcohol to destroy residual catalyst and the polymer water washed in a kneader. After hot milling to dry the product, 235 grams of dry, elastic polymer was obtained, showing a conversion from the monomer of 72.5% and a catalyst efficiency of 158 g. polymer/g. of $SbF_5$. The intrinsic viscosity of the polymer in diisobutylene was 1.02, giving a Staudinger molecular weight of 32,000. Polymerization of isobutylene was attempted in a manner similar to that employed above and using antimony pentachloride as the catalyst. Addition of 400 cc. (measured at $-78°$ C.) of (0.2 g. $SbCl_5/100$ cc. of methyl chloride) catalyst followed by 100 cc. of concentrate (1.0 g. $SbCl_5/100$ cc. methyl chloride) produced no polymer of any description. The $SbCl_5$ was completely inactive as a polymerization catalyst under these conditions.

*Example 2.—Copolymer of isobutylene and isoprene*

A charge consisting of 1050 grams of methyl chloride, 339 grams of isobutylene and 10.5 grams of isoprene (99% pure) was polymerized under similar conditions as those used in Example 1. Catalyst solution (700 cc.) was added in 31 minutes. The resulting polymer after it was washed and dried, was a soft rubbery material, 128 grams, showing conversion of 36.5%, catalyst efficiency of 91.5 g./g. $SbF_5$, intrinsic viscosity of 0.89, Staudinger molecular weight of 28,000 and mole percent unsaturation of 1.28.

*Example 3.—Copolymer of isobutylene and isoprene*

Similarly, using ethylidene fluoride as diluent in place of methyl chloride, catalyst solution (700 cc.) was added to the charge over 31 minutes. This resulted in an exceedingly fine dry slurry with no polymer formation on the reactor walls. The polymer was quenched, washed, and hot milled, giving a yield of 137 gms. of soft elastomer. The conversion is thus 39% at a catalyst efficiency of 98 g./g. $SbF_5$. Intrinsic viscosity in diisobutylene is 0.794 and Staudinger molecular weight is 25,000 and mole percent unsaturation is 1.29.

*Example 4.—Copolymer of isobutylene and styrene*

A feed consisting of 1275 cc. ($-78°$ C.) of methyl chloride, 135 gms. styrene and 90 gms. isobutylene was used. The reaction mixture was chilled externally with liquid ethylene to $-102°$ C. Catalyst solution was added over a 40-minute period. About 600 cc. of 0.2 g. $SbF_5/100$ cc. methyl chloride plus 210 cc. of 1.0 g. $SbF_5/100$ concentrate was used to complete the reaction. The polymer formed at the start was in semi-solution form but it dissolved completely as the reaction proceeded. The product after quenching, washing and hot milling was a semi-hard brittle material of fair transparency. The yield was 215 gms. or 96% conversion and 65 g./g. $SbF_5$ catalyst efficiency. In toluene the intrinsic viscosity was 0.596 and the refractive index indicated 51.7% styrene in the polymer. Similarly, copolymerization of isobutylene and styrene was attempted following the technique and formula employed above using $SbCl_5$ as catalyst. No polymer was produced.

*Example 5.—Copolymer of isobutylene and styrene*

A similar polymerization was conducted using ethylidene fluoride as the diluent replacing methyl chloride. As catalyst there was added over a period of 40 minutes, 600 cc. of 0.2 g. $SbF_5/100$ cc. of methyl chloride plus 20 cc. of 1.0 g. $SbF_5/100$ cc. concentrate. A dry yield of 170 grams of tough, hard, semi-transparent polymer was obtained. Conversion is thus 75.5% at a catalyst efficiency of 121 g. polymer/g. $SbF_5$. Intrinsic viscosity in toluene was 0.958. About 53.4% of the polymer is styrene. Improvements in molecular weight, efficiency and styrene utilization are realized with ethylidene fluoride as the diluent. The product obtained from this experiment is different from that obtained in Example 4. The differences are believed due, at least in part, to the use of the ethylidene fluoride as the reaction diluent. This material is less of a solvent for the product than is methyl chloride, and, consequently, the dispersion of catalyst and temperature control are different.

*Example 6.—Polypropylene*

The charge to the reactor consisted of a solution of 8.6 gms. of $SbF_5$ in 500 gms. of methyl chloride. External refrigeration using solid carbon dioxide in naphtha was employed. The propylene (335 gms.) was added over a period of about 2½ hours. The chart of the addition is as follows:

| Time | Temp., °C. | Propylene Addition, cc. |
|---|---|---|
| 0 min | −76 | |
| 26 min | −68 | 100 |
| 1 hr., 36 min | −66 | 350 |
| 2 hr., 33 min | −58 | 480 |
| 2 hr., 51 min | −60 | 550 |
| 3 hr., 30 min | −71 | |

The reaction was quenched with acetone-water mixture. Following an alkali wash, the product was taken up in naphtha. The naphtha was taken off up to a temperature of 250° F. The polypropylene polymer product obtained was viscous and cloudy. The intrinsic viscosity was .085 and the conversion obtained was 52%.

*Example 7.—Polyvinyl isobutyl ether*

One hundred grams of vinyl isobutyl ether was diluted with 2 volumes of methyl chloride. This mixture was treated with a catalyst solution consisting of from 0.2 to 1.0 gram of $SbF_5/100$ cc. methyl chloride. The reaction was carried out using liquid ethylene as the external refrigerant.

Polymerization was immediate to give a homopolymer consisting of polyvinyl isobutyl ether. This indicates that the vinyl ethers will undergo polymerization readily with antimony pentafluoride as the catalyst.

What is claimed is:

1. The process of preparing a solid, plastic hydrocarbon interpolymer which is reactive with vulcanization agents which comprises reacting together a mixture of isobutylene and a conjugated diolefin having from 4 to 6 carbon atoms per molecule in the presence of an inert, non-complexing solvent by the application thereto of a catalyst solution consisting of $SbF_5$ dissolved in an inert, non-complexing solvent, said polymerization being conducted at a temperature of from 0° to −165° C.

2. The process of preparing a solid, plastic hydrocarbon interpolymer which comprises mixing together a major proportion of isobutylene with a minor proportion of a conjugated diolefin having from 4 to 6 carbon atoms per molecule, diluting said mixture with an inert, non-complexing diluent, and polymerizing said mixture by the application thereto of $SbF_5$ dissolved in an inert, non-complexing solvent, said polymerization being conducted at a temperature of from 0° to −165° C.

3. A process according to that described in claim 2 in which the conjugated diolefin is butadiene.

4. A process according to that described in claim 2 in which the conjugated diolefin is isoprene.

5. The process of preparing a solid, plastic hydrocarbon interpolymer which is reactive with vulcanization agents to yield an elastic product, which comprises mixing together from 99 to 95 weight per cent of isobutylene and from 1 to 5 weight per cent of isoprene, diluting said olefin mixture with a halogenated alkane having from 1 to 3 carbon atoms and polymerizing the resulting mixture at a temperature between 0° and −165° C. by the addition thereto of a solution consisting of about 0.1 to 5% by weight of $SbF_5$ dissolved in a halogenated alkane having from 1 to 3 carbon atoms.

6. The process of preparing a solid, plastic hydrocarbon interpolymer, which comprises mixing together from 90 to 40 weight per cent of isobutylene and from 10 to 60 weight percent of a styrene, diluting said olefin mixture with a halogenated alkane having from 1 to 3 carbon atoms and polymerizing the resulting mixture at a temperature between 0° and −165° C. by the addition thereto of a solution consisting of $SbF_5$ dissolved in a halogenated alkane having from 1 to 3 carbon atoms.

7. The process of preparing a high molecular weight hydrocarbon polymer which comprises polymerizing a reaction feed selected from the group cosisting of a polymerizable olefin of 3 to 8 carbon atoms and mixtures thereof with a material selected from the group consisting of conjugated diolefins of 4 to 6 carbon atoms, styrene and alkyl styrenes, in the presence of an inert solvent consisting essentially of a halogenated alkane of 1 to 3 carbon atoms, the amount of halogen being from 1 atom per molecule up to the replacement of one-half of the hydrogen atoms of the alkane by halogen atoms, and said halogen being selected from the group consisting of chlorine and fluorine, by the application thereto of $SbF_5$ as a polymerization catalyst at a temperature of from 0 to −165° C.

8. Process according to claim 7 in which the inert solvent is selected from the group consisting of methyl chloride and ethylidene fluoride.

9. A process of preparing a high molecular weight hydrocarbon polymer which comprises polymerizing a reaction feed selected from the group consisting of a polymerizable olefin of 3 to 8 carbon atoms and mixtures thereof with a material selected from the group consisting of conjugated diolefins of 4 to 6 carbon atoms, styrene and alkyl styrenes in the presence of an inert non-complexing solvent by the application thereto of $SbF_5$ as a polymerization catalyst at a temperature of from 0 to −165° C.

10. A process according to claim 9 in which the feed consists of isobutylene.

11. A process according to claim 9 in which the feed consists of propylene.

References Cited in the file of this patent

UNITED STATES PATENTS

| | | |
|---|---|---|
| 1,216,933 | Bosch | Feb. 20, 1917 |
| 1,923,583 | Pungs | Aug. 22, 1933 |
| 2,139,038 | Russell | Dec. 6, 1938 |
| 2,406,869 | Upham | Sept. 3, 1946 |
| 2,454,796 | Hampton | Nov. 30, 1948 |

OTHER REFERENCES

McBee et al.: Ind. Eng. Chem. 39, 305–9 (1947).

Slesser and Schram: "Fluorine & Fluoro Organic Compounds," Nuclear Energy Series, pages 588, 589, McGraw-Hill (1951).